United States Patent [19]

Page

[11] Patent Number: 4,538,548

[45] Date of Patent: Sep. 3, 1985

[54] GRAVITY FEED DOG FEEDER

[76] Inventor: Aime R. Page, 17 Elm St., Proctor, Vt. 05765

[21] Appl. No.: 629,380

[22] Filed: Jul. 10, 1984

[51] Int. Cl.$^3$ .............................................. A01K 5/00
[52] U.S. Cl. .................................................. 119/52 R
[58] Field of Search ............................. 119/52 R, 53

[56] References Cited

U.S. PATENT DOCUMENTS

| | | | |
|---|---|---|---|
| 846,175 | 3/1907 | Xevers | 119/53 |
| 896,268 | 8/1908 | Bennett | 119/52 R |
| 1,113,842 | 10/1914 | Sill | 119/52 R |
| 2,826,171 | 3/1958 | Piel | 119/52 R |
| 2,969,769 | 1/1961 | Paschall | 119/53 X |
| 3,229,665 | 8/1964 | Baltz | 119/52 AF |
| 3,372,676 | 3/1968 | Williams | 119/52 R |
| 3,720,184 | 3/1973 | Pearce | 119/51.5 |
| 3,763,826 | 10/1973 | Portelli | 119/52 R |
| 4,029,051 | 6/1977 | McKinney | 119/52 R |
| 4,281,624 | 8/1981 | Raines | 119/52 R |
| 4,303,039 | 12/1981 | Thibault | 119/52 R |

Primary Examiner—Hugh R. Chamblee
Attorney, Agent, or Firm—Henderson & Sturm

[57] ABSTRACT

A gravity feed pet feeder apparatus (10) comprising an elevated cylindrical food reservoir (11) having an axially off-set tubular feed chute (13), disposed above a bowl element (28), and further provided with a transparent shield element (27) that wraps around a portion of the food reservoir and the bowl element.

1 Claim, 6 Drawing Figures

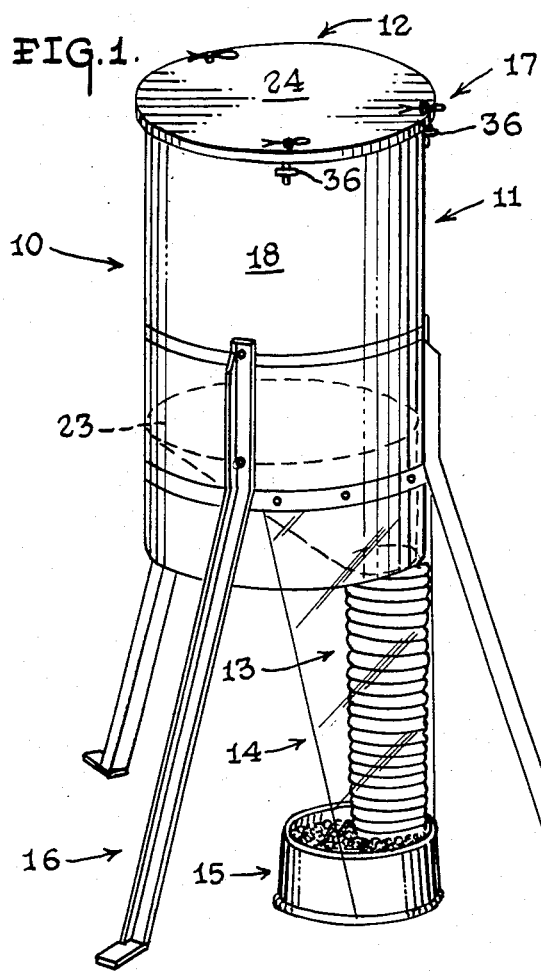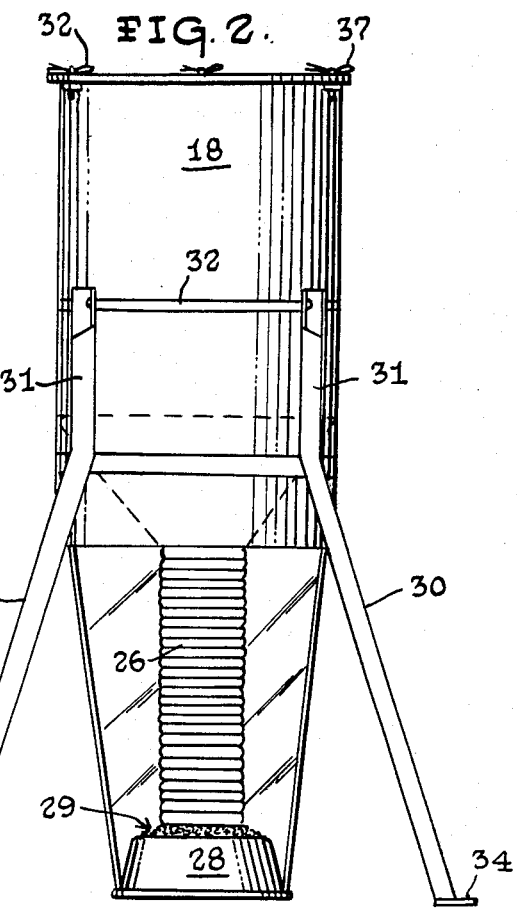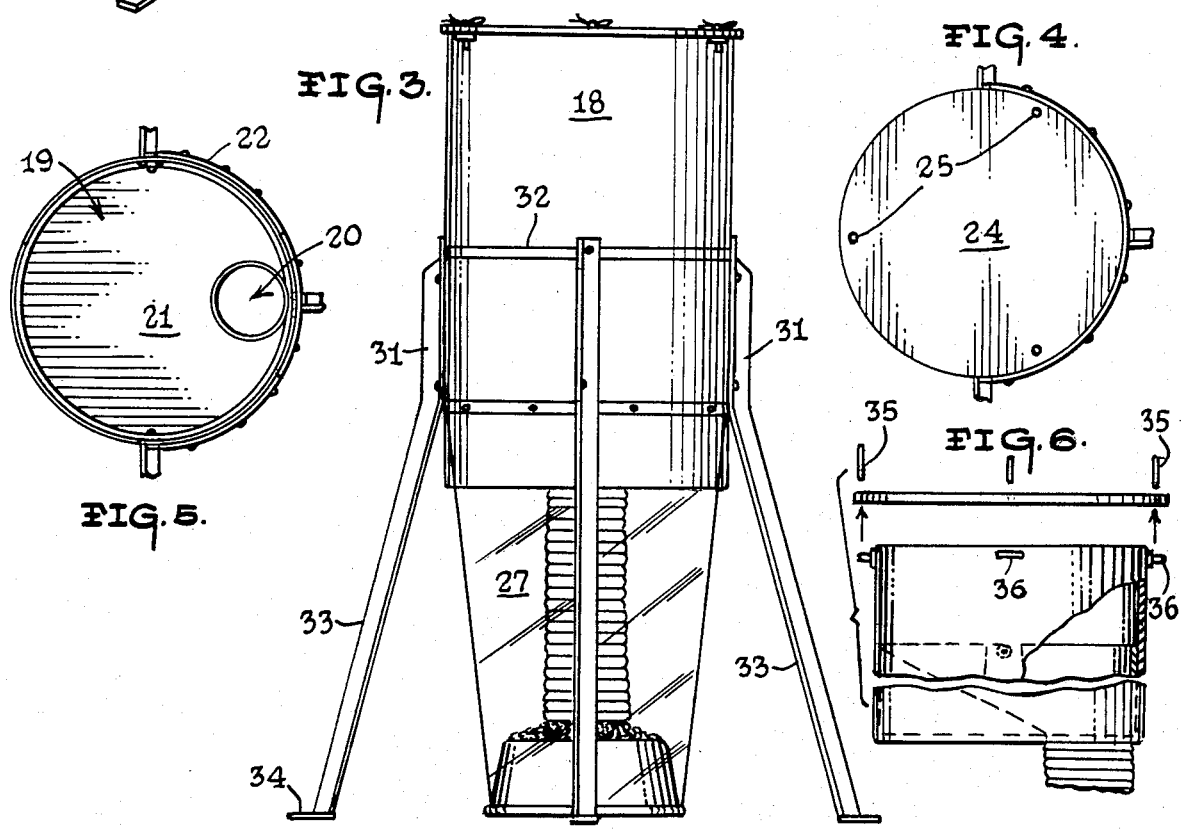

GRAVITY FEED DOG FEEDER

TECHNICAL FIELD

This invention relates generally to gravity type feeders for domestic animals.

BACKGROUND ART

Innumerable attempts have been made in the past to develop the ideal gravity feed pet feeder. The basic structural components of this type of a device comprise: a food reservoir; a narrow delivery chute, that will restrict the flow of the food from the reservoir; and, a feeding trough or tray that will function as a receptacle for the particular food.

As mentioned supra the prior art is replete with structures that were designed to perform the aforementioned function. Examples of some of the prior art constructions may be seen by reference to the following U.S. Pat. Nos. 4,303,039; 3,372,676; 3,763,826; 3,229,665; and 4,281,624.

As can be seen by reference to the above cited patents, the prior art constructions range from the very simple versions with no moving parts, to the very complex mechanized versions. While all of the prior art constructions are adequate for their intended purpose and function, the simpler versions have proven to be more commercially successful based on their simplicity.

It should be noted however, that even the simply constructed prior art structures are deficient: with regard to protecting the delivered food particles from the elements; as well as failing to take into consideration that, certain individual animals, of both the domestic and wild varieties, are very reluctant to take food from a location where their natural line of vision is substantially obstruted.

DISCLOSURE OF THE INVENTION

The above stated problems are substantially resolved by the provision of the instant invention. The instant invention includes generally a reservoir unit, a closure unit, a chute unit, a shield unit, a tray unit, a support unit, and securing means.

While most of the aforementioned components may be found in the prior art, the specific combination of components, and their unique construction that represents a definite advance in this area of technology.

The reservoir unit and the chute unit of the present invention are configured and aligned to promote the gravity feed of dry particulate feed through the chute unit. The cover unit is dimensioned and designed to be imperforate in the region of the reservoir unit opening, to overlie the reservoir unit, and to be secured to exterior projections on the reservoir unit.

In addition the shield unit is rigidly secured to both the reservoir unit and the tray unit. The shield unit is also transparent and disposed in a wrap-around relationship with respect to the tray unit. This relationship forms an effective weather barrier around a substantial portion of the tray unit periphery, which is further enhanced by the axially off-set relationship between the reservoir unit and the feed chute unit.

BRIEF DESCRIPTION OF THE DRAWINGS

These and other attributes and novel features of the invention will become more clear upon a thorough study of the following description of the best mode for carrying out the invention, particularly when reviewed in conjunction with the drawings, wherein:

FIG. 1 is a perspective view of the apparatus;
FIG. 2 is a front elevational view;
FIG. 3 is a rear elevational view;
FIG. 4 is a partial top plan view;
FIG. 5 is a partial bottom plan view; and
FIG. 6 is a detail side view.

BEST MODE FOR CARRYING OUT THE INVENTION

Referring now to the drawings, and in particular to FIG. 1, the apparatus may be seen depicted generally by the numeral 10. The apparatus (10) includes generally a reservoir unit (11), a closure unit (12), a chute unit (13), a shield unit (14), a tray unit (15), a support unit (16), and a securing means (17). Each of these units will now be described in seriatim fashion.

The reservoir unit (11) comprises an elongated cylindrical drum element (18) having an enlarged opening (19) at its top, and a smaller axially off-set opening (20) formed in the floor (21) of the drum and disposed adjacent the cylindrical drum wall (22). The reservoir unit (11) is also provided with a funnel insert member (23) (shown in phantom), wherein the funnel body is off-set with respect to the funnel inlet, and the funnel outlet is dimensioned and disposed to be received within the off-set opening (20) in the floor of the drum.

The closure unit (12) comprises a circular lid element (24) that is dimensioned to overlie and project beyond the enlarged reservoir opening (19). The portion of the lid element (24) that projects beyond the periphery of the drum element (18) is further provided with a plurality of apertures (25) that are dimensioned to receive the securing means (17) to fasten the lid element (24) to the drum element (18).

The chute unit (13) comprises an elongated tubular chute element (26), that is rigidly secured to the bottom of the drum element (18) directly beneath the small drum opening (20). The elongated tubular chute element (26) projects a substantial distance below the drum element (18), and in effect forms an extension of the funnel insert member (23) outlet.

The shield unit (14) comprises an elongated generally V-shaped transparent shield element (27), whose upper portion is rigidly secured to the exterior surface of the reservoir wall (22), adjacent the location of the chute element (26); and whose lower portion is operatively connected to a portion of the tray unit (15). In the preferred embodiment, the shield element (27) is fabricated from clear plastic such as plexiglass or the like; however, any suitable transparent generally rigid material would suffice.

The tray unit (15) comprises a bowl element (28) which is connected to the bottom of the shield element (27) and disposed beneath the outlet end of the chute element (26). In the preferred embodiment, the outlet end of the chute element (26) is positioned directly over, and may extend partially into, the opening of the bowl element (28); however, it is to be understood that the level of the chute outlet within the bowl will dictate the level of the dried particulate pet food (29) deposited into the tray unit (15).

The support unit (16) comprises a plurality of elongated support legs (30), whose upper portions (31) are mounted flush with the wall (22) of the drum element (18) and connected together by a circular metallic band element (32). The lower portion (33) of the support legs

(30) are angled outwardly from the drum element (18) and are further provided with flanged feet (34), which provide the apparatus (10) with a spaced, stable support structure.

The securing means (17) comprise a plurality of securing elements (35) which are operatively connected to brackets (36) projecting outwardly from the upper periphery of the drum element (18). The securing elements (35) are dimensioned to extend through the apertures (25) in the lid element (24), and cooperate with locking elements (37) to fasten the lid element (24) to the drum element in a secure manner.

While the securing means (17) illustrated in the drawings are of the apertured post and cotter pin type, it should be appreciated that any suitable securing means could be employed, as long as the securing means fastened to or through the outer periphery of the lid element, leaving the portion of the lid element covering the reservoir opening imperforate.

It should also be noted that the shield element (27) forms a protective transparent cowl around the periphery of the bowl element (28), which extends to the reservoir drum (18) and increases in width as its height increases. This arrangement provides a wrap-around barrier to the elements, which is further enhanced by the off-set position of the bowl beneath the food supply. The position of the bowl beneath the reservoir not only shades the bowl during the hottest part of the day, but also provides a covering that prevents rain or snow from falling on the dry food in the bowl.

The final structural feature that should be noted is that when the apparatus (10) is fabricated solely for out door use, the bottom of the bowl element (28) will be elevated slightly above the bottom of the support leg feed (34). The reason for this being, to allow the weight of the loaded apparatus (10) to be borne solely by the support legs (30) and not the bowl element (28).

The operation of this apparatus conforms to the operation of most other gravity feeders in that the dried food is deposited in the reservoir, the funnel insert directs the food to the chute and the food particles will fill the bowl to the level permitted by the chute outlet. The animals are thereby provided with a supply of dry food that is replenished from the reservoir until the food supply is totally consumed.

Obviously, many substitutions, modifications and variations of this invention are possible in light of the above teachings. It is therefore to be understood that, within the scope of the appended claim, the invention may be practiced otherwise than as specifically described.

What I claim is:
1. A gravity feed pet feeder apparatus consisting of:
an elevated, elongated, cylindrical food reservoir having a plurality of elongated angled support legs attached to the bottom of the cylindrical food reservoir for supporting said food reservoir in an elevated position;
an off-set tubular chute in open communication with the interior of said food reservoir; wherein said food reservoir further comprises: a funnel member wherein the inlet of the funnel insert member conforms to the wall of the cylindrical food reservoir, and the outlet of the funnel insert member is dimensioned and disposed to be in open communication with said off-set tubular chute;
a bowl element disposed beneath the outlet of said tubular chute;
a circular lid element adapted to engage and extend beyond the periphery of the cylindrical food reservoir; and,
a shield element extending between, and connected to, the cylindrical food reservoir and the bowl element; wherein said shield element is transparent and extends around a portion of the periphery of the cylindrical food reservoir and the bowl element in a cowl like fashion.

* * * * *